United States Patent [19]
Lanet

[11] 3,899,532
[45] Aug. 12, 1975

[54] METHOD FOR THE SIMULTANEOUS PRODUCTION OF ORGANIC ACID CHLORIDES AND CHLORINATED UNSATURATED HYDROCARBONS

[75] Inventor: Jean-Claude Lanet, Saint-Auban, France

[73] Assignee: Rhone-Progil, Courbevoie, France

[22] Filed: Oct. 29, 1973

[21] Appl. No.: 410,966

[30] Foreign Application Priority Data
Oct. 31, 1972  France .............................. 72.38554

[52] U.S. Cl. ..... 260/544 M; 260/651 R; 260/654 R; 260/544 Y
[51] Int. Cl.² ......................................... C07C 21/04
[58] Field of Search ........ 260/544 M, 654 R, 544 Y

[56] References Cited
UNITED STATES PATENTS
3,225,106  12/1965  Rabinowitz ..................... 260/654 R
3,345,420  10/1967  Gilch .............................. 260/654 R

*Primary Examiner*—James A. Patten
*Assistant Examiner*—Richard D. Kelly

[57] ABSTRACT

A method for the simultaneous production of organic acid chloride and unsaturated hydrocarbons by heating in the presence of a Lewis acid as a catalyst, of a ketone having the general formula: $R_1R_2R_3C — CO — CHR_4R_5$ with a trichloromethylated hydrocarbon having a double bond in the alpha position and represented by the general formula $R — C Cl_3$ in which $R_1$, $R_2$, $R_3$, $R_4$ and $R_5$ are identical or different from each other, are atoms of hydrogen, halogens F, Cl or Br, $C_1$ to $C_3$ alkyl groups which may possibly be substituted by atoms of halogens F, Cl and/or Br, or $C_6$ or $C_{10}$ aryl groups which may possibly be substituted by $C_1$ to $C_3$ alkyl groups and/or atoms of halogens F, Cl and/or Br; and R represents a $C_6$ or $C_{10}$ aromatic hydrocarbon residue which is unsubstituted, or which is substituted by at least a $C_1$ to $C_3$ alkyl group and/or at least a halogen atom F, Cl or Br; or an alkenyl group having the formula: $XY = CZ^-$, in which X, Y and Z are identical to or different from each other and represent atoms of hydrogen, halogen F, Cl and/or Br, $C_1$ to $C_3$ alkyl groups or $C_1$ to $C_3$ alkyl groups which are substituted by at least a halogen atom F, Cl or Br.

17 Claims, No Drawings

METHOD FOR THE SIMULTANEOUS PRODUCTION OF ORGANIC ACID CHLORIDES AND CHLORINATED UNSATURATED HYDROCARBONS

This invention relates to the simultaneous production of an acid chloride and a hydrocarbon comprising a chlorine atom linked to a hydrocarbon group having a double bond, by performing a novel reaction of a ketone on a trichloromethylated hydrocarbon having a double bond in the alpha position.

In accordance with the invention, an alpha-unsaturated trichloromethylated hydrocarbon having the general formula R C Cl₃ is reacted, by heating, with a ketone having the general formula:

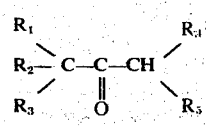

in which $R_1$, $R_2$, $R_3$, $R_4$ and $R_5$ are the same or different from each other, and represent atoms of hydrogen, halogens such as F, Cl or Br, $C_1$ to $C_3$ alkyl groups unsubstituted or which may be substituted by atoms of halogens such as F, Cl and/or Br, or $C_6$ or $C_{10}$ aryl groups unsubstituted or which may be substituted by $C_1$ to $C_3$ alkyl groups and/or by atoms of halogens such as F, Cl and/or Br; and R represents a $C_6$ or $C_{10}$ aromatic hydrocarbon residue which is unsubstituted or which is substituted by at least one $C_1$ to $C_3$ alkyl group and/or by at least one halogen atom such as F, Cl or Br; or an alkenyl group having the formula:

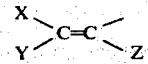

in which X, Y and Z are the same or different from each other and represent atoms of hydrogen, halogen such as F, Cl and/or Br, $C_1$ to $C_3$ alkyl groups or $C_1$ to $C_3$ alkyl groups which are substituted by at least one halogen atom such as F, Cl or Br, in the presence of a Lewis acid as a catalyst.

The catalyst is employed in an amount within the range of 0.1 to 3% by weight with respect to the starting trichloromethylated compound and preferably 0.5 to 1.5% by weight.

The reaction according to the invention can be diagrammatically illustrated by the following equation:

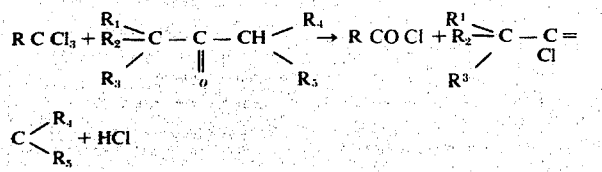

The molar ratio between the ketone and the trichloromethylated derivative is generally employed within the range of 0.1 to 4, more particularly 0.5 to 2, but it is preferred to carry out the operation with the materials within the ratio of 0.9 to 1.1.

The reaction is carried out at a temperature within the range of 50° to 260°C and preferably 130° to 160°C.

Although the reaction is preferably carried out at atmospheric pressure but can be performed at a positive pressure of from 1 to 5 bars or a pressure below 1 bar, such for example as at 0.5 bar.

The following list of Lewis acids which can be used is given by way of illustration and not by way of limitation: Al Cl₃, Sb Cl₅, Sb Cl₃, Ti Cl₄, B Cl₃, Ga Cl₃, Sn Cl₄, Zr Cl₄, BF₃, B Br₃ and preferably Zn Cl₂ and/or Fe Cl₃.

In accordance with one embodiment of the invention, the ketone is added slowly to a mixture of trichloromethylated derivative and Lewis acid, which is raised to a temperature within the range previously described, while stirring the reaction medium.

The hydrogen chloride given off as a secondary product of the reaction can be collected by any suitable means, such as by bubbling through a water trap, to form a hydrochloric acid solution, or by passing the effluent gas through a basic trap (potash soda) for neutralization.

It is of advantage to distill the formed unsaturated chlorinated hydrocarbon as it is being formed in the reaction medium, while the unreacted ketone and the organic acid chloride which is formed therein is returned by reflux to the reaction zone from the distillation column.

At the end of the reaction, the organic acid chloride is recovered by any suitable means, preferably by distillation at atmospheric or subatmospheric pressure.

The following examples are given by way of illustration and not by way of limitation of the invention.

EXAMPLE 1

391 g of phenylchloroform (2 moles) and 3 g of anhydrous Fe Cl₃ are introduced into a 1 liter glass reaction vessel provided with a distillation column, a heat exchanger and a stirrer. The resulting mixture is raised to a temperature of 140°C and 120 g of acetone (2.07 moles) is added thereto, with stirring, over a period of 8 hours. 122 g of 2-chloropropene (1.6 moles), which is a yield of 77.3% with respect to the acetone, is collected by distillation in a container, which is cooled by a brine. The hydrogen chloride, which is given off as a secondary reaction product, is collected by bubbling through a water trap positioned downstream of the container in which the 2-chloropropene is condensed. 255 g of benzoyl chloride (1.81 mole), corresponding to a yield of about 91%, is obtained by distillation of the material remaining in the reaction vessel.

EXAMPLE 2

498 g of hexachloropropene (2 moles) and 3 g of Fe Cl₃ is introduced into the apparatus of Example 1, raised to a temperature of 140°C, whereupon 120 g of acetone (2.07 moles) is added thereto over a period of 20 hours. 105 g of 2-chloropropene (1.37 moles), which is a yield of 66% with respect to the acetone introduced, is then collected by distillation. The hydrogen chloride, which is given off, is collected as described in Example 1. Distillation of the residue gives 270 g of trichloroacryloyl chloride (1.4 moles), which is a yield of 70%.

EXAMPLE 3

391 g of phenylchloroform (2 moles) and 3 g of Fe Cl₃ are introduced into the same apparatus as that of Example 1. After the mixture has been heated to 140°C, 150 g of methylethyl ketone (2.08 moles) is introduced over a period of 8 hours. After distillation, a distillate is then collected which contains 135 g of a mixture of cis and trans 2-chloro 2-butene and 2-chloro 1-butene (1.49 moles), which corresponds to a yield of approximately 72% with respect to the ketone introduced. The hydrogen chloride given off is recovered as in Example 1, in the form of an aqueous solution of hydrochloric acid. Distillation of the remaining substance provides 255 g of benzoyl chloride (1.6 moles), corresponding to a yield of 80%.

EXAMPLE 4

A vertical tubular reaction vessel, having a diameter of 50 mm and a height of 50 cm, and containing an equimolecular mixture of hexachloropropene and trichloroacryloyl chloride is continuously supplied with acetone at the bottom of the reaction vessel and with a solution of Fe $Cl_3$ with a content of 0.1% by weight in hexachloropropene, at the head of the reaction vessel. The temperature is maintained at 145°C. The respective flow rates of acetone and hexachloropropene are 1 and 2 moles/hour, respectively.

Mounted on top of the reaction vessel is a contact tower with a filling. The effluent gases are cooled and comprise a mixture of HCl (1 mole/hour) and organic compounds containing 2-chloropropene (93.5%) and 2,2-dichloropropane (6.5%). The latter are condensed in a container, while the uncondensed HCl is recovered by passing it through a water trap.

The level in the reaction vessel is kept constant by means of an overflow from which an equimolecular mixture of hexachloropropene and trichloroacryloyl chloride flows and which is recovered by distillation.

The yields of 2-chloropropene and trichloroacryloyl chloride are respectively 93% with respect to the acetone and 92% with respect to the hexachloropropene.

EXAMPLE 5

195.5 g (1 mole) of phenylchloroform and 2 g of $ZnCl_2$ are introduced into a 500 ml three-necked balloon flask provided with a stirrer, a funnel, a thermometer, and upon which is mounted a distillation column. The temperature is raised to 140°C and then 86 g (1 mole) of pentan-3-one is added dropwise over a period of 1 hour.

The distilled product, after washing with water and drying, provides a distillate which contains 92 g of 3-chloro distillation-pentene, corresponding to a yield of approximately 88% with respect to the starting ketone. The HCl given off is recovered in the form of an aqueous solution. Distillation of the residue provides 105 g (0.78 mole) of benzoyl chloride (yield: 78%).

It will be understood that changes may be made in the details of formulation and operation without departing from the spirit of the invention, especially as defined in the following claims.

I claim:

1. A method for the simultaneous production of organic acid chloride and chlorinated unsaturated hydrocarbons, characterized in that a ketone having the general formula:

$$\begin{array}{c} R_1 \\ R_2 - C - C - CH \\ R_3 \quad \underset{O}{\|} \quad R_5 \end{array} \diagup R_4$$

is reacted, by heating, in the presence of a Lewis acid as a catalyst, with a trichloromethylated hydrocarbon having a double bond in the alpha position and having the formula $R - C \ Cl_3$ in which $R_1$, $R_2$, $R_3$, $R_4$ and $R_5$ represent atoms selected from the group consisting of hydrogen, halogens, $C_1$ to $C_3$ alkyl groups unsubstituted or substituted by halogens or $C_6$ to $C_{10}$ aryl groups which may be unsubstituted or substituted by $C_1$ to $C_3$ alkyl groups or halogens; and R represents a group selected from the group consisting of (a) a $C_6$ or $C_{10}$ aromatic hydrocarbon residue, unsubstituted or substituted by at least one group selected from the group consisting of $C_1$ to $C_3$ alkyl groups, and at least one halogen atom and (b) an alkenyl group having the formula $$\begin{array}{c} X \\ Y \end{array} \diagup C = C \diagdown _{[X]Z}$$

in which X, Y and Z are the same or different from each other and represent atoms selected from the group consisting of hydrogen, halogen, $C_1$ to $C_3$ alkyl groups and $C_1$ to $C_3$ alkyl groups which are substituted by at least one halogen atom.

2. A method as claimed in claim 1 in which the halogens identified in claim 1 are selected from the group consisting of fluorine, chlorine and bromine.

3. A method as claimed in claim 1 in which $R_1$, $R_2$, $R_3$, $R_4$ and $R_5$ are the same.

4. A method as claimed in claim 1 in which $R_1$, $R_2$, $R_3$, $R_4$ and $R_5$ are different.

5. A method as claimed in claim 1 in which the heating temperature is from 50° to 260°C.

6. A method as claimed in claim 1 in which the heating temperature is within the range of 130° to 160°C.

7. A method as claimed in claim 1 in which the Lewis acid is selected from the group consisting of Zn $Cl_2$ and Fe $Cl_3$.

8. A method as claimed in claim 1 in which the Lewis acid is employed in an amount within the range of 0.1 to 3% by weight with respect to the starting trichloromethylated derivative.

9. A method as claimed in claim 1 in which the molar ratio of the ketone to the trichloromethylated derivative is within the range of 0.1 to 4.

10. A method as claimed in claim 1 in which the molar ratio of ketone to the trichloromethylated derivative is within the range of 0.9 to 1.1.

11. A method as claimed in claim 1 in which the reaction is carried out at atmospheric pressure.

12. A method as claimed in claim 1 in which the reaction is carried out at a pressure within the range of 1 to 5 bars.

13. A method as claimed in claim 1 in which the ketone is slowly added to the mixture of the trichloromethylated derivative and the Lewis acid, while the reaction medium is stirred.

14. A method as claimed in claim 1 in which the chlorinated unsaturated hydrocarbon is distilled as it is formed in the reaction medium.

15. A method as claimed in claim 1 in which the organic acid chloride formed in the reaction medium is recovered by distillation at atmospheric or subatmospheric pressure.

16. A method as claimed in claim 1 in which the Lewis acid is selected from the group consisting of Al $Cl_3$, Sb $Cl_5$, Sb $Cl_3$, Ti $Cl_4$, B $Cl_3$, Ga $Cl_3$, Sn $Cl_4$, Zr $Cl_4$, B $F_3$ or B $Br_3$.

17. A method as claimed in claim 1 in which the Lewis acid is employed in an amount within the range of 0.5 to 1.5% by weight with respect to the starting trichloromethlated derivative.

* * * * *

UNITED STATES PATENT OFFICE
CERTIFICATE OF CORRECTION

Patent No. 3,899,532             Dated     August 12, 1975

Inventor(s)    Jean-Claude Lanet

It is certified that error appears in the above-identified patent and that said Letters Patent are hereby corrected as shown below:

column 1, line 18, in the formula, change $R_{o4}$ to $R_4$;

column 3, line 48, change "chloro distillation pentene" to "chloro 2-pentene"

Signed and Sealed this

*twenty-third* Day of *December 1975*

[SEAL]

*Attest:*

RUTH C. MASON
*Attesting Officer*

C. MARSHALL DANN
*Commissioner of Patents and Trademarks*